United States Patent
Rzezak et al.

(10) Patent No.: US 10,757,099 B2
(45) Date of Patent: Aug. 25, 2020

(54) SYSTEM AND METHOD FOR PROVIDING FRAUD CONTROL

(71) Applicant: Intraway R&D S.A., Montevideo (UY)

(72) Inventors: Leandro Rzezak, Buenos Aires (AR); Matias Torchinsky, Buenos Aires (AR)

(73) Assignee: Intraway R&D SA, Montevideo (UY)

( * ) Notice: Subject to any disclaimer, the term of this patent is extended or adjusted under 35 U.S.C. 154(b) by 242 days.

(21) Appl. No.: 15/649,728

(22) Filed: Jul. 14, 2017

(65) Prior Publication Data
US 2018/0020000 A1 Jan. 18, 2018

Related U.S. Application Data

(60) Provisional application No. 62/362,749, filed on Jul. 15, 2016.

(51) Int. Cl.
*H04L 29/06* (2006.01)
*H04N 21/258* (2011.01)
(Continued)

(52) U.S. Cl.
CPC .......... *H04L 63/0876* (2013.01); *G06F 21/57* (2013.01); *H04L 63/101* (2013.01);
(Continued)

(58) Field of Classification Search
CPC . H04L 63/0876; H04L 63/101; H04L 63/166; G06F 21/57; G06F 21/2541;
(Continued)

(56) References Cited

U.S. PATENT DOCUMENTS 5,724,510 A * 3/1998 Arndt ................. H04L 29/12018
370/252
6,625,258 B1 * 9/2003 Ram .................. H04L 29/06027
379/373.01

(Continued)

OTHER PUBLICATIONS

European Search Report and Opinion for EP 17181529 dated Feb. 9, 2018.

(Continued)

*Primary Examiner* — Kambiz Zand
*Assistant Examiner* — Mahabub S Ahmed
(74) *Attorney, Agent, or Firm* — Peter A. Nieves; Sheehan Phinney Bass & Green PA

(57) ABSTRACT

A system and method for detecting fraud in a network is disclosed. The network includes cable modems, a network collector, cable modem termination systems (CMTS), and a network data converger. The network collector scans a first cable modem and receives and sends to the network data converger device identification for the first modem and an address of a first CMTS connected to the first cable modem. The network collector adds this information to a devices inventory. The network collector scans a second cable modem and receives and sends to the network data converger device identification and an address of a second CMTS connected to the second cable modem. The network data converger compares this information to the information in the devices inventory and may determine fraud based on the comparison.

21 Claims, 4 Drawing Sheets

(51) Int. Cl.
*H04N 21/254* (2011.01)
*H04N 21/61* (2011.01)
*H04N 21/426* (2011.01)
*H04N 21/647* (2011.01)
*G06F 21/57* (2013.01)
*G06Q 20/40* (2012.01)

(52) U.S. Cl.
CPC ..... *H04N 21/2541* (2013.01); *H04N 21/2585* (2013.01); *H04N 21/25816* (2013.01); *H04N 21/25841* (2013.01); *H04N 21/25875* (2013.01); *H04N 21/25883* (2013.01); *H04N 21/42684* (2013.01); *H04N 21/6118* (2013.01); *H04N 21/6168* (2013.01); *H04N 21/64738* (2013.01); *G06Q 20/401* (2013.01); *H04L 63/166* (2013.01)

(58) Field of Classification Search
CPC ......... G06F 21/25816; G06F 21/25841; G06F 21/2585; G06F 21/25875; G06F 21/25883; G06F 21/42684; G06F 21/6118; G06F 21/6168; G06F 21/64738; G06Q 20/401
USPC ............................................................ 726/4
See application file for complete search history.

(56) References Cited

U.S. PATENT DOCUMENTS

| | | | | |
|---|---|---|---|---|
| 6,636,971 B1* | 10/2003 | Loukianov | ............... | G06F 21/79 713/176 |
| 7,512,969 B2* | 3/2009 | Gould | ............... | H04L 29/12264 709/222 |
| 7,864,700 B2* | 1/2011 | Shepard | ............... | H04L 41/0853 370/254 |
| 7,908,645 B2* | 3/2011 | Varghese | ............... | G06Q 20/341 726/4 |
| 8,725,837 B2* | 5/2014 | Pacella | ............... | H04L 41/0853 709/218 |
| 8,972,364 B2* | 3/2015 | Harris | ............... | A63F 13/71 463/29 |
| 9,544,625 B2* | 1/2017 | Sellers | ............... | H04N 21/25841 |
| 9,629,928 B1* | 4/2017 | Olsen | ............... | A61K 48/00 |
| 9,641,418 B1* | 5/2017 | Moyer | ............... | H04L 43/16 |
| 9,686,238 B1* | 6/2017 | Row, II | ............... | H04L 63/0876 |
| 10,122,630 B1* | 11/2018 | Koenning | ............... | H04L 45/745 |
| 2001/0038645 A1* | 11/2001 | McKinnin, III | ............... | H04N 21/64738 370/490 |
| 2002/0052915 A1* | 5/2002 | Amin-Salehi | ...... | H04Q 11/0407 709/203 |
| 2002/0133613 A1* | 9/2002 | Teng | ............... | H04L 43/06 709/235 |
| 2003/0101357 A1* | 5/2003 | Ronen | ............... | H04L 63/0272 726/23 |
| 2004/0123329 A1* | 6/2004 | Williams | ............... | H04L 61/2046 725/111 |
| 2004/0177133 A1* | 9/2004 | Harrison | ............... | H04L 61/2015 709/220 |
| 2004/0190544 A1* | 9/2004 | Azenko | ............... | H04L 43/18 370/442 |
| 2004/0261116 A1* | 12/2004 | Mckeown | ............... | H04L 43/00 725/109 |
| 2005/0078609 A1* | 4/2005 | Sharma | ............... | H04M 15/56 370/254 |
| 2005/0078688 A1* | 4/2005 | Sharma | ............... | H04L 47/24 370/401 |
| 2005/0078689 A1* | 4/2005 | Sharma | ............... | H04L 12/2801 370/401 |
| 2005/0114880 A1* | 5/2005 | Gould | ............... | H04L 29/12839 725/25 |
| 2005/0160280 A1* | 7/2005 | Caslin | ............... | H04L 43/00 713/189 |
| 2005/0183130 A1* | 8/2005 | Sadja | ............... | H04N 17/00 725/107 |
| 2005/0212504 A1* | 9/2005 | Revital | ............... | H04N 21/6547 324/100 |
| 2006/0031921 A1* | 2/2006 | Danforth | ............... | H04L 63/10 726/1 |
| 2006/0282660 A1* | 12/2006 | Varghese | ............... | G07F 7/1041 713/155 |
| 2007/0022469 A1* | 1/2007 | Cooper | ............... | H04L 63/107 726/3 |
| 2007/0276943 A1* | 11/2007 | Marez | ............... | H04L 63/1458 709/225 |
| 2008/0031143 A1* | 2/2008 | Ostrosky | ............... | H04M 7/006 370/242 |
| 2008/0034385 A1* | 2/2008 | Cruickshank, III | ... | H04H 20/12 725/14 |
| 2008/0046951 A1* | 2/2008 | Hrastar | ............... | H04H 20/79 725/122 |
| 2008/0076425 A1* | 3/2008 | Khetawat | ............... | H04W 88/12 455/436 |
| 2008/0109864 A1* | 5/2008 | Danforth | ............... | H04L 29/12264 725/111 |
| 2008/0126540 A1* | 5/2008 | Zeng | ............... | H04L 63/1458 709/225 |
| 2008/0201785 A1* | 8/2008 | Overcash | ............... | H04N 21/64322 726/35 |
| 2008/0235746 A1* | 9/2008 | Peters | ............... | H04N 21/6168 725/111 |
| 2008/0244076 A1* | 10/2008 | Shah | ............... | H04L 67/18 709/227 |
| 2009/0122706 A1* | 5/2009 | Alfano | ............... | H04L 41/5003 370/237 |
| 2010/0043041 A1* | 2/2010 | Ford | ............... | H04N 21/42684 725/111 |
| 2010/0070639 A1* | 3/2010 | Hoggan | ............... | H04L 63/10 709/229 |
| 2010/0154057 A1* | 6/2010 | Ko | ............... | H04L 65/1006 726/23 |
| 2010/0202462 A1* | 8/2010 | Riddel | ............... | H04L 29/12283 370/400 |
| 2011/0030065 A1* | 2/2011 | Kulakowski | ....... | H04N 21/2541 726/26 |
| 2011/0107404 A1* | 5/2011 | Ramsdell | ............... | H04L 12/1403 726/5 |
| 2011/0107436 A1* | 5/2011 | Cholas | ............... | H04L 63/10 726/29 |
| 2011/0142042 A1* | 6/2011 | Field | ............... | H04L 63/104 370/390 |
| 2011/0164505 A1* | 7/2011 | Salam | ............... | H04L 61/10 370/241 |
| 2011/0219229 A1* | 9/2011 | Cholas | ............... | H04L 9/32 713/168 |
| 2011/0271311 A1* | 11/2011 | Berger | ............... | H04N 21/6402 725/100 |
| 2012/0008786 A1* | 1/2012 | Cronk | ............... | H04L 9/30 380/282 |
| 2012/0011567 A1* | 1/2012 | Cronk | ............... | H04L 63/102 726/4 |
| 2012/0030724 A1* | 2/2012 | Godas | ............... | H04W 12/00 725/111 |
| 2012/0047545 A1* | 2/2012 | Sellers | ............... | H04N 21/24 725/111 |
| 2012/0047583 A1* | 2/2012 | Nyemahame | .... | H04N 21/25816 726/26 |
| 2012/0291084 A1* | 11/2012 | Rakib | ............... | H04N 21/6118 725/111 |
| 2014/0082650 A1* | 3/2014 | Sellers | ............... | H04N 21/25841 725/16 |
| 2014/0150047 A1* | 5/2014 | Rakib | ............... | H04N 21/4782 725/129 |
| 2014/0310416 A1* | 10/2014 | Durbha | ............... | H04L 63/08 709/225 |
| 2015/0058421 A1* | 2/2015 | Brookins | ............... | G06Q 10/00 709/204 |

(56) References Cited

U.S. PATENT DOCUMENTS

| | | | |
|---|---|---|---|
| 2015/0071305 A1* | 3/2015 | Wang | H04L 47/765 370/468 |
| 2015/0237385 A1* | 8/2015 | Sellers | H04N 21/24 725/111 |
| 2015/0358336 A1* | 12/2015 | Le Rouzic | H04L 63/126 726/22 |
| 2016/0119284 A1* | 4/2016 | Kim | H04W 12/04 726/12 |
| 2016/0192199 A1* | 6/2016 | Alvarez Dominguez | H04W 12/12 455/410 |
| 2016/0248751 A1* | 8/2016 | Yao | H04L 63/102 |
| 2016/0359662 A1* | 12/2016 | Liu | H04N 21/6118 |
| 2017/0126586 A1* | 5/2017 | Chen | H04L 67/02 |
| 2017/0163626 A1* | 6/2017 | Meng | H04L 63/083 |
| 2017/0188232 A1* | 6/2017 | Raleigh | H04W 12/0605 |
| 2017/0308681 A1* | 10/2017 | Gould | G06F 21/10 |
| 2017/0339631 A1* | 11/2017 | Pugaczewski | H04L 63/101 |
| 2018/0007054 A1* | 1/2018 | Els | H04L 63/0254 |
| 2018/0165431 A1* | 6/2018 | Neumann | G06F 21/44 |
| 2018/0343252 A1* | 11/2018 | Evesti | H04L 63/0876 |
| 2019/0013968 A1* | 1/2019 | Xie | H04L 12/4641 |
| 2019/0028475 A1* | 1/2019 | Back | H04L 63/0876 |

OTHER PUBLICATIONS

Partial European Search Report and Opinion for EP 17181529 dated Nov. 16, 2017.

* cited by examiner

SYSTEM AND METHOD FOR PROVIDING FRAUD CONTROL

CROSS-REFERENCE TO RELATED APPLICATIONS

This application claims the benefit of U.S. Provisional Patent Application Ser. No. 62/362,749, filed Jul. 15, 2016, entitled "System and Method for Providing Fraud Control," which is incorporated by reference herein in its entirety.

FIELD OF THE INVENTION

The present invention relates generally to the real-time detection and prevention of fraud in the broadcast cable business. More specifically, it relates to systems and methods for a cable operator to detect and prevent fraud by subscribers or illegitimate users.

BACKGROUND OF THE INVENTION

A telephony or content-distribution services operating over a cabled network with cable modems, for example, a cable operator, renders services to subscribers. Subscribers hire services from the cable operator including, but not limited to, broadband Internet access and IP (Internet Protocol) telephony. The subscribers may connect to a private network (hereafter "the network") to consume these services, where the network may be owned, partially owned or rented by the cable operator. Subscribers may connect their computers, routers, IP telephones, tablets, cell phones, and possibly other devices to the network through network terminals, called cable modems.

The cable operator may impose restrictions to the service it provides in different offered subscription plans, for example, through Terms of Service agreements. Some subscribers or non-subscribers may attempt to violate these restrictions in order to get an advantage and, for example, get subscription services without paying for these or get services not included in their subscription plan. The cable operator is incentivized to detect and prevent fraud while at the same time ensuring that such fraud detection and prevention does not impact its legitimate subscribers.

Fraud against a cable operator may take various forms. For example, a fraudster may modify the firmware of a cable modem to mimic the cable modem used by a subscriber thus attempting to get the services paid by this subscriber for free. For another example, a subscriber having two homes may pay for cable services on one home where roaming (moving the cable modem to a second home) is not allowed. The subscriber may move the cable modem (provided by the cable operator) to a second home where there is a physical connection and in an attempt to get unpaid access. As another example, a fraudster may attempt to get "faster" (higher bandwidth) internet access by tampering with the configuration of a cable modem, or alter the firmware in any other form to get some advantage. Or a fraudster may modify a cable modem to prevent it from receiving messages from the Cable modem Termination System (CMTS), and thus answer to Simple Network Management Protocol (SNMP) traps which could lead to detecting fraud or updating its firmware. Other types of fraud are also possible.

Fraud management is a complex part of the business for a cable operator. Fraud management consists of actions that lead to detecting fraud, and the policies used to decide what to do in case of a detected fraud. Fraud management deals with detection and prevention of fraud and without causing a perceptible impact to paying subscribers. Therefore, there is a need in the industry to address one or more of the abovementioned issues.

SUMMARY OF THE INVENTION

Embodiments of the present invention provide a system and method for providing fraud control. Briefly described, a first aspect of the present invention is directed to a communication network that includes cable modems, a network collector, cable modem termination systems (CMTS), and a network data converger. The network collector scans a first cable modem and receives and sends to the network data converger device identification for the first modem and an address of a first CMTS connected to the first cable modem. The network collector adds this information to a devices inventory. The network collector scans a second cable modem and receives and sends to the network data converger device identification and an address of a second CMTS connected to the second cable modem. The network data converger compares this information to the information in the devices inventory and may determine fraud based on the comparison.

A second aspect of the present invention is directed to a network including a database engine, a network collector, a network data converger, and a Cable Modem Termination System. The network collector scans the cable modem to obtain a configured upward speed and/or downward speed. A configured upward speed and/or downward speed is sent to the network data converger. The network data converger queries the database engine for an allowed upward speed and/or downward speed of a subscription plan associated with the cable modem. The allowed upward speed and/or downward speed is compared with the configured upward speed and/or downward speed, and an occurrence of fraud is declared if the compared values match.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

BRIEF DESCRIPTION OF THE DRAWINGS

The accompanying drawings are included to provide a further understanding of the invention, and are incorporated in and constitute a part of this specification. The components in the drawings are not necessarily to scale, emphasis instead being placed upon clearly illustrating the principles of the present invention. The drawings illustrate embodiments of the invention and, together with the description, serve to explain the principles of the invention.

DETAILED DESCRIPTION

Figure 1:
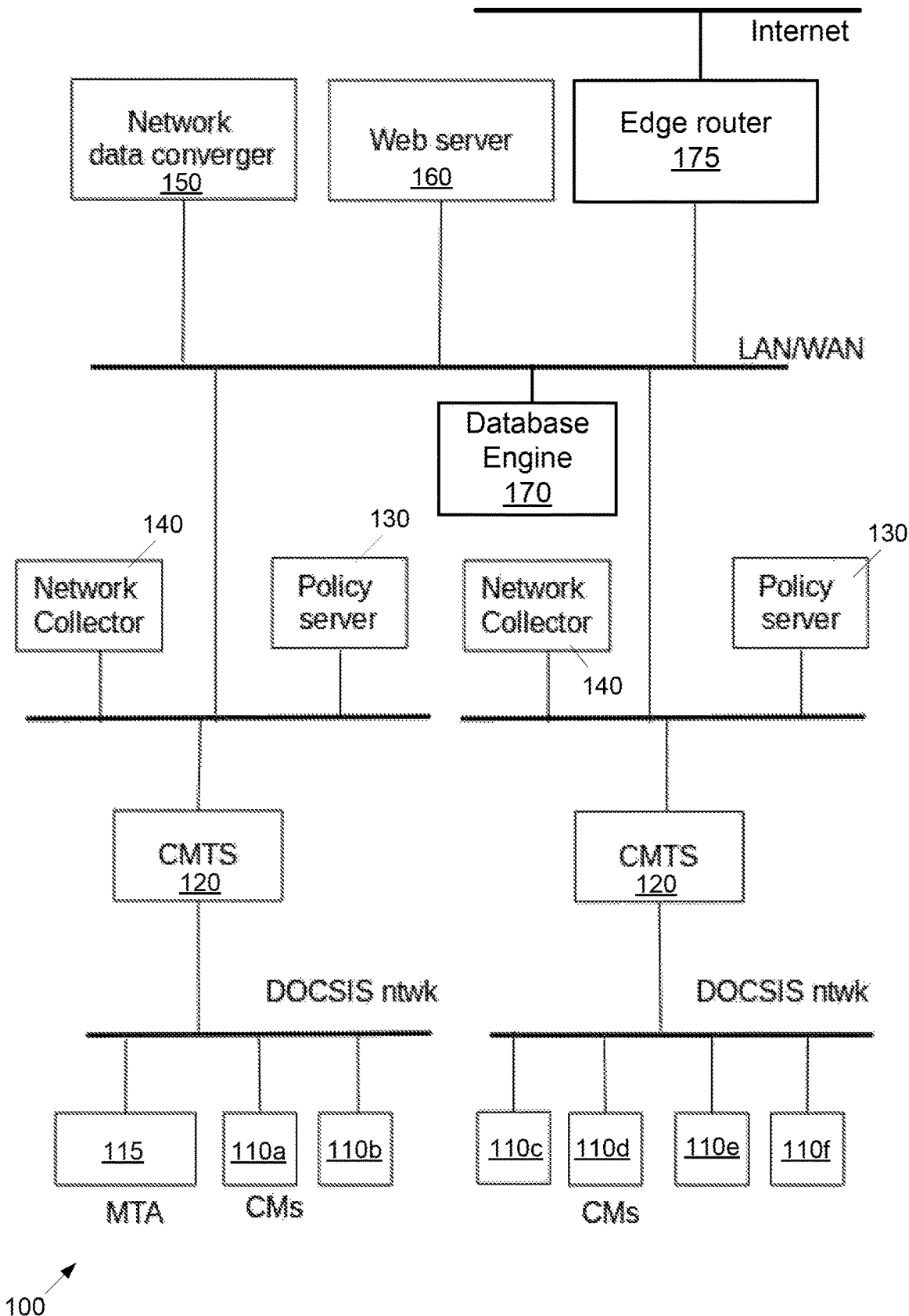
FIG. 1 is a schematic diagram showing an exemplary network of a cable operator for deploying a first embodiment of the present invention.

Reference will now be made in detail to embodiments of the present invention, examples of which are illustrated in the accompanying drawings. Wherever possible, the same reference numbers are used in the drawings and the description to refer to the same or like parts.

The following definitions are useful for interpreting terms applied to features of the embodiments disclosed herein, and are meant only to define elements within the disclosure.

As used within this disclosure, "device identification" refers to data that may be used to identify a network device such as a cable modem or CMTS. The device identification may include, but is not limited to, a MAC address, a firmware version, and/or a serial number.

As used within this disclosure, "device configuration" refers to data that may be used to configure one or more operational parameter of a network device such as a cable modem or CMTS. The device identification may include, but is not limited to, data bandwidth information such as an IP address and upward and downward speeds.

As used within this disclosure, a "fraud attempt" is an action performed by a party wanting to gain unwarranted access or services from the cable operator. Referring to FIG. 1, this may typically be done by using a device whose software (and hardware) imitates a cable modem 110a-f of a subscriber. For example, a fraudster may somehow gain information on a first cable modem 110a used by a legitimate subscriber. In one scenario, the fraudster learns device identification such as the MAC address, firmware version, and serial number of a first cable modem 110a and modifies ("clones") a second cable modem 110c so that it answers with the MAC address, firmware version and serial number of the first cable modem 110a when queried, for example, via the SNMP protocol. If the fraudster connects the second cable modem 110c to a cable operator network which implements no fraud detection mechanisms, the second cable modem 110c (clone) will be given the same services that the first cable modem 110a receives. Even if the first cable modem 110a and the clone cable modem 110c are connected at the same time to the cable operator network, both may be allowed. This is mainly because the Provisioning Servers are stateless servers that simply respond to requests as they receive them. Here, a "Provisioning Server" refers to one of a group of servers in charge of provisioning including but not limited to CMTS, DHCP (Dynamic Host Configuration Protocol), TFTP (Trivial File Transfer Protocol) or HTTP/HTTPS (Hypertext Transfer Protocol/Hypertext Transfer Protocol Secure) servers. When a cable modem boots, the cable modem starts a registration process including ranging with a CMTS 120 and establishing with it a communication channel. The cable modem then interacts with DHCP and TFTP (or HTTP or HTTPS) servers to connect to the IP network and download a cable modem configuration file. The configuration file may contain device configuration for the cable modem and may be tailored for the specific subscription plan, cable modem vendor and model, and in particular may include the upwards and downwards speeds. The CMTS 120 reads the upwards and downwards speeds from the configuration file, and is in charge of allowing the CABLE MODEM 110a-f to download and upload according to these. Once the cable modem joins the network, it is configured with an IP address.

In another example, a subscriber might move the cable modem 110a to a different location, non-limiting examples being a holiday home, an office or a second home. The cable operator may not allow this action (called roaming). The cable operator would like to detect roaming attempts, and maybe even block them. This may not be possible without the intervention of a fraud management solution. Moreover, a fraud management solution preventing roaming must do so with care, since there are also legitimate reasons for a cable modem 110a-f to logically move to a different location (for example, node splits which are explained later in this description).

Figure 2:
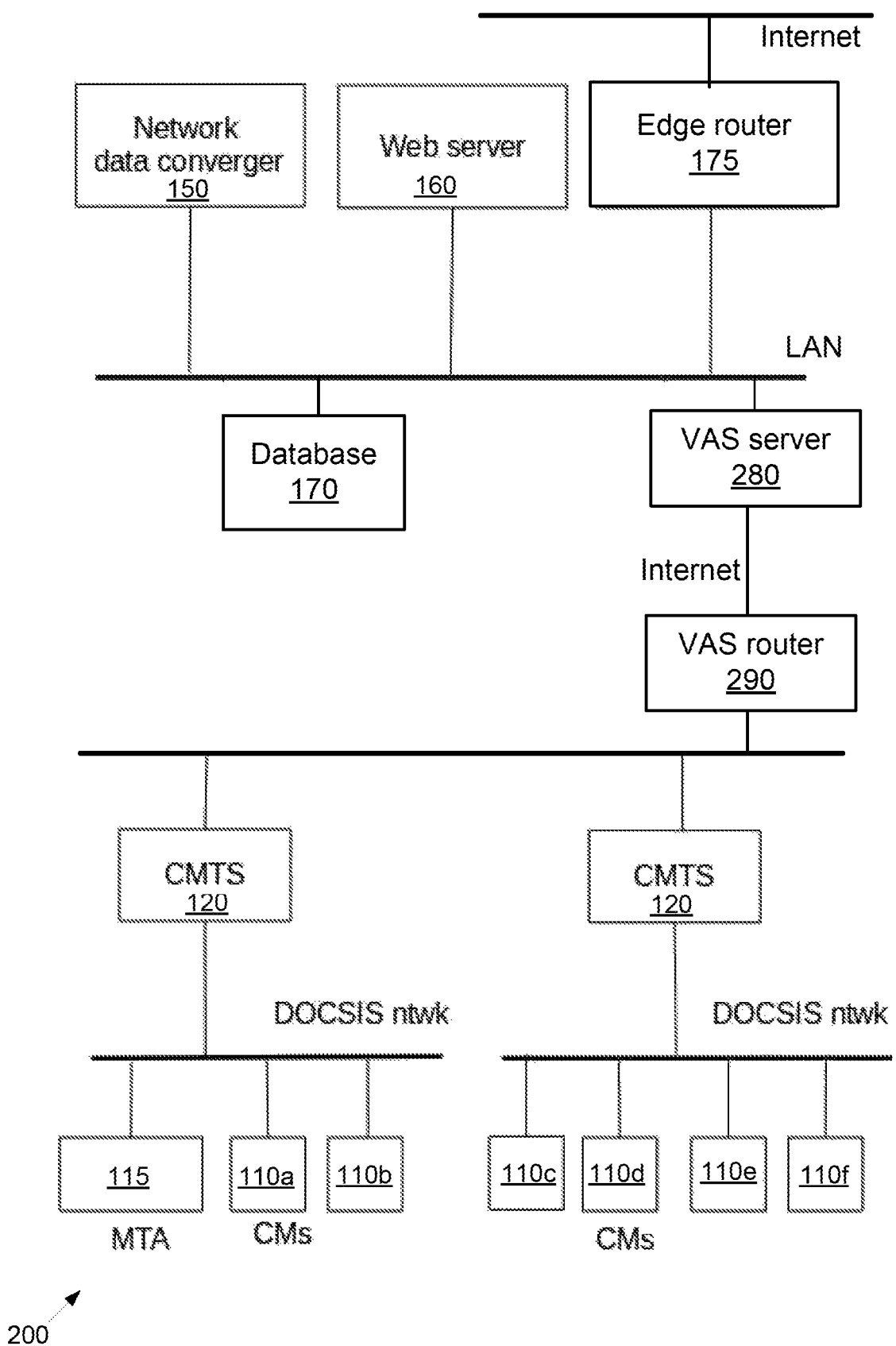
FIG. 2 is a schematic diagram showing an exemplary network of a cable operator for deploying a second embodiment of the present invention.

It should be noted that the cable modems 110a-f described herein may generally be regarded as similar and/or interchangeable devices, and are therefore are referred collectively as cable modems 110a-f. However, in specific examples it may be useful to distinguish between cable modems 110a-f, so each cable modem 110a-f may be referred to individually, for example, as a first cable modem 110a and a second cable modem 110c. Although in FIGS. 1 and 2 the cable modem 110a and a second cable modem 110c are illustrated as being connected to different DOCSIS networks associated with different CMTS 120, unless otherwise noted the identification of a specific cable modem 110a-f may be considered as purely exemplary without regard to its specific location in the networks 100 (FIG. 1), 200 (FIG. 2).

In order to overcome the shortcomings described in the Background section, exemplary embodiments of the present invention include methods and mechanisms that detect the above-mentioned forms of fraud and give the cable operator options to deal with these cases. For example, each provisioning group (described below) executes a fraud management protocol with a policy server 130, a fraud detection server, a CMTS 120, network collector 140 and/or termination systems (e.g., cable modems 110a-f) to this end.

FIG. 1 shows an exemplary network 100 of a cable operator deploying a first embodiment of the present invention. A private network may be deployed and run according to the Data Over Cable Service Interface Specification (DOCSIS) standard. The nodes in this network 100 may include but are not limited to cable modems (CM) 110a-f, captive portal web applications, captive portal web managers, provisioning groups, cable modem termination systems (CMTS 120), policy servers 130, network collectors 140 (or network collector 140 servers), network data convergers 150 (NDC) or NDC servers, an edge router 175, and multimedia terminal adapters 115 (MTA), among others.

Cable modems 110a-f are generally hardware devices that execute software and/or firmware, and may be uniquely identified by a factory-assigned media access control (MAC) address. A captive portal web application is a web application that renders information which is received from the captive portal web manager, for example, to users of the cable operator network when fraud is discovered. If the connection for the cable modem 110a-f is detected as illegitimate by the fraud management solution, the cable operator may intercept most packets coming from this cable modem 110a-f, regardless of their destination address and port. A request from a web browser made through this connection may be redirected to the captive portal web application, and answered with a webpage describing the terms of use, or an arbitrary message or webpage configured by the operator, for example, it may be a message describing the situation.

The captive portal web manager is an application used for fraud management, marketing messaging and other purposes. Under the first embodiment, a captive portal web manager may allow the user to configure a response template (e.g., an HTML template) that may be used by the captive portal web application. When a web browser makes a request to the captive portal web application, for example, that the request comes from a cable modem 110a-f connection which has been detected as fraudulent, this template may be used to craft the response.

A provisioning group may encompass a group of servers including a policy server 130 and a CMTS 120. These items are described below. A CMTS 120 is a broadband router that connects to one or more cable modems 110*a-f* through coaxial and/or optical fiber cable, converts their signals to the IP protocol and into an (IP) router. This CMTS 120-IP router pair connects cable modems 110*a-f* to the other equipment in the network. The CMTS 120 under the first embodiment may be configured to allow operations in the Packet Cable Multimedia (PCMM) specification. In particular to this invention, the PCMM specification defines a framework that can be used for marking all the network packets received from cable modems 110*a-f* with a certain identifier according to fraud policies.

An application runs on a policy server 130 which periodically polls the policies table in the database. A policy defines an action which applies to one (or possibly more) cable modems 110*a-f*. In particular to the present system and method, the policy server 130 may read a fraud-related policy and send a PacketCable Multimedia (PCMM) gateset message to one CMTS 120. For example, all the packets sent from the cable modems 110*a-f* underlying any policy through this CMTS 120 may be marked using the Type Of Service field in its IPv4 header.

A network collector 140 is a server primarily used for inventorying the cable modems 110*a-f* in its provisioning group. The network collector 140 may at least execute scans in the following situations: a) network collector 140 performs discovery scans of all the cable modems 110*a-f* connected to its provisioning group once it is activated and periodically, the periodicity being configured by the cable operator, b) when a cable modem 110*a-f* registers, then only this cable modem 110*a-f* is scanned, c) when asked by the network data converger 150 to either scan all the cable modems 110*a-f* or a single one. Once the network collector 140 receives this information, it may update the devices table, also referred to as the devices inventory, in the database engine 170. Scanned information is obtained through an SNMP scan or a scan through SNMP. The discovery scan is an SNMP scan where the network collector 140 uses the SNMP protocol to obtain information for the cable modems 110*a-f*. To scan all the cable modems 110*a-f*, the network collector 140 first obtains general information from SNMP tables in the CMTS 120 including but not limited to DOCSIS Capability, IPs, interfaces, and information for every cable modem 110*a-f* connected to this CMTS 120 (such as the MAC address of the cable modem 110*a-f*, IP address of the CMTS 120, the CMTS 120 interfaces it connects to, and its status). Additionally, when the network collector 140 scans a single cable modem 110*a-f*, it retrieves from the cable modem 110*a-f* the SysDescription (that provides the information about the Vendor, Model, Hardware and Software versions, and serial number) and possibly other parameters.

An NDC server 150 runs an application that is in charge of detecting and reporting fraud. The NDC server 150 may run two procedures. A reactive procedure which is triggered every time a cable modem 110*a-f* connects to the network 100 and is in charge of assessing if the connection is fraudulent, if it should be watch listed, or is valid. Also the NDC server 150 may run a watch list monitor procedure periodically to decide if the elements in the watch list should be considered as valid, fraudulent, if the element should be eliminated from the watch list, or if the decision should be delayed until more information becomes available. This is explained in greater detail below.

A database engine 170 may serve the applications, and include one or more of several types of tables. In particular, the devices table (alternatively referred to as the devices inventory or table of cable modems 110*a-f*) may identify each cable modem 110*a-f* by its MAC address. After a network collector 140 performs an SNMP scan to a cable modem 110*a-f*, the entry for this cable modem 110*a-f* may be updated (recall that the cable modem 110*a-f* is identified by its MAC address) with the scan's information. The scan may include at least the serial number for the cable modem 110*a-f*, the IP address of the CMTS 120 and the time when the information was updated. A second policy table may store policies describing a subject (either the IP address of a cable modem or the MAC address of a cable modem 110*a-f* and the IP address or MAC domain of the CMTS 120 it connects to) and an action. A watch list table may be queried by the policy server 130 and its use is described below. A subscription table may link each subscriber to a subscription plan and a cable modem 110*a-f* in the devices table. The information for the subscription plan may include, but is not limited to, the location where the service is received, and the upwards and downwards speed for the service.

An edge router 175 is a router that connects to the provisioning groups, the captive portal web application, the database engines 170, and to the internet. The edge router 175 may implement Policy Based Routing (PBR).

In a standard cable network, once a cable modem 110*a-f* is physically connected to the network 100 it boots to get a logical connection. In this process, it first acquires connectivity to a CMTS 120, and then negotiates with the Provisioning Servers in order to get the cable modem 110*a-f* configured and give it access to the cable services.

The following descriptions are presented to contrast scenarios where fraud is present with a network where no fraud is present. Each case is to be considered independently. The following describes the network data converger 150 and the policy server 130 in more detail.

In the following examples, an aging threshold is a positive integer and a watch list threshold is also a positive integer. The allowance of roaming may be defined as a parameter, for example yes (roaming is allowed) or no (roaming is not allowed).

An exemplary embodiment of a network data converger 150 runs two processes: a reactive process that is triggered every time a cable modem 110*a-f* registers to a CMTS 120 and validates whether the connection should be allowed, and a periodic process tasked with managing the watch list.

Each CMTS 120 is configured to send SNMP traps to its respective network collector 140 when a cable modem 110*a-f* is turned on or off. These may be standard SNMP traps that are sent every time a cable modem 110*a-f* registers or deregisters in the CMTS 120. If the trap is off, the network collector 140 may update the cable modem 110*a-f* status as offline in the devices table. If the trap is on, the network collector 140 may send an SNMP get command to the cable modem 110*a-f* to retrieve updated information on this device (the cable modem 110*a-f*), relay this information to the NDC and then the NDC updates this information into the devices table when the NDC allows access to the cable modem 110*a-f*.

In the reactive process, when a cable modem 110*a-f* connects to the network, the underlying CMTS 120 forwards the cable modem 110*a-f* information to the network controller 140. When this happens, the network collector 140 scans the cable modem 110*a-f*, for example, by SNMP, and receives a tuple generally consisting at least of MAC address, serial number and a timestamp that contains the date and time when the information retrieval takes place, herein called the "received information." Next, the network collector 140 sends the received information to the network data converger 150.

The network data converger 150 waits for these tuples of received information. Once the network data converger 150 receives one such tuple, the network data converger 150 does one or more validation checks that are enumerated herein to ensure that the cable modem 110a-f connection is not fraudulent.

First, the network data converger 150 checks if the MAC address is associated with a subscription by querying the database management system. If the MAC address is associated with a subscription, the NDC 150 queries the devices table for all the information it has associated to the MAC address in the received information and obtains analogous values that are referred to herein as the "stored information." If the serial number in the stored and received information do not agree, then fraud is detected with the classification "Different Serial." If this happens, the NDC 150 writes a new policy in the policies table with fraud information and the validation is terminated. The fraud information includes but is not limited to MAC address, serial number, fraud type (Different serial), and the IP address identifying the CMTS 120 to which the cable modem 110a-f is connected.

If the validation continues, the NDC 150 computes the aging of the stored information by computing the number of minutes elapsed between the timestamp in the stored information and the timestamp in the retrieved information. If the aging of the stored information exceeds the aging threshold (defined during setup), then the NDC 150 asks the network controller to check if the cable modem 110a-f (underlying the stored information) is still online; to do this, the network controller checks the database in the CMTS 120, or may scan the cable modem 110a-f through SNMP.

One CMTS 120 may have several MAC domains. A MAC domain is a unique value. The configuration of the CMTS 120 defines the number of MAC domains it has and each cable modem 110a-f connection offered by the CMTS 120 is assigned to a MAC domain. It should be noted that it is possible for a CMTS 120 to not accept connections from two cable modems 110a-f with the same MAC address, or alternatively not accept two cable modems 110a-f (with the same MAC address) within the same MAC domain (but accept two cable modems 110a-f with the same MAC address in the same CMTS 120 when they have different MAC domains).

If the CMTS 120 IP address (or alternatively the MAC domain) referenced in the stored information is the same as the one in the retrieved information, then no fraud is detected and the validation is terminated. In this case, it is assumed that the cable modem 110a-f first turned offline and went back online at this moment.

If the cable modem 110a-f referenced in the stored information is still online and connected to a different CMTS 120 (alternatively MAC domain), then the NDC 150 detects fraud, for example, with a classification "Original online."

If the cable modem 110a-f referenced in the stored information is offline and the CMTS 120 IP (or alternatively MAC domains) differ, then the outcome depends on whether roaming is allowed. If roaming is allowed, then the connection is considered as potential fraud and the cable modem 110a-f underlying the received information is added to the watch list. If roaming is not allowed, then the cable modem 110a-f is added to the watch list and fraud is detected.

Alternatively, the present system and method allows using a more accurate method for pinpointing the point in the network where the cable modem 110a-f connects to: instead of comparing the IP address of the CMTS 120 as above, it will compare the MAC domain within the CMTS. A MAC domain is a unique value. One CMTS 120 may have several MAC domains. The configuration of the CMTS 120 will define the number of MAC domains and which of the cable modem 110a-f connections it offers are assigned to each MAC domain.

If fraud has been detected, then the NDC 150 writes a new policy in the policies table. The policy may include, for example, the MAC address, serial number, CMTS 120 IP address for the cable modem in the received information and fraud classification, and/or other information to manage fraud.

If the cable modem 110a-f is added to the watch list table, in general at least the following information may be recorded: the stored information and the received information (the information for the original and the new cable modems 110a-f).

The NDC 150 may iterate over all the items in the watch list in a periodic process. If the time elapsed between the timestamp and the present is bigger than the watch list threshold, the entry is removed and the event is logged as an occurrence of roaming (when roaming is allowed).

Before the elapsed time between the present and a watch list item timestamp exceeds the watch list threshold, the network data converger 150 checks for the status of the cable modem 110a-f in the stored information. As described above, each watch list item includes at least, one tuple of stored information and one tuple of retrieved information. This may be done by sending a command to the network controller to retrieve the information for the MAC address under scrutiny. The answer is called the refreshed information. If a cable modem 110a-f appears online, other than that in the received information, then one of the following outcomes may occur.

If the CMTS 120 IP address (alternatively MAC domain) for the cable modem 110a-f in the refreshed information is the same as the cable modem 110a-f in the stored information, then the cable modem 110a-f in the received information is marked as Fraud classified as "Original online" and the item is removed from the watch list. If the CMTS 120 IP address (alternatively MAC domain) for the cable modem 110a-f in the refreshed information is a third value (different from stored and received information), and if the cable modem 110a-f in the received information is still online, then the cable modem 110a-f in the refreshed information is marked as Fraud and classified as "Watch listed online." However, the watch list item is not removed.

The policy server 130 may run a procedure which periodically polls the policies table. As used herein, a "policy" defines an action which applies to one cable modem 110a-f ID (the ID being a unique identifier assigned to the tuple CMTS 120 IP/MAC domain, MAC address, serial number). In particular to this invention, fraud policies define which cable modems 110a-f may preferably be denied access to the internet and have its requests redirected to the captive portal web application. This may be achieved in different ways.

In a first embodiment, the edge router 175 redirects traffic as follows. For each fraud policy found, the associated information includes a MAC address for the offending cable modem 110a-f and an IP address for the CMTS 120 the offending cable modem 110a-f is connected to. The policy server 130 may use this information to send a PacketCable Multimedia (PCMM) gate-set message to the aforementioned CMTS 120. This command makes the CMTS 120 mark all the packets sent from the cable modem 110*a-f* with this MAC address using the Type Of Service field in the header of each IPv4 packet. In the case of IPv6, traffic redirection may be implemented using Policy Based Routing (PBR) by DiffServ (Differentiated Services) specified in an IETF standard (RFC 2474). The standard determines how to define the DiffServ field within IP headers, and a classification scheme for this field. Every marked packet, including those sent by this cable modem 110*a-f* through this CMTS 120 and reaching the edge router 175, is forwarded, for example, by the edge router 175, to the captive portal web application. Responses from the captive portal web-application are sent back in the opposite direction.

Alternatively, instead of implementing the traffic redirection in the edge router 175, traffic redirection may be implemented by the CMTS 120, where the CMTS 120 redirects the traffic to the Captive Portal based on the ToS/DiffServ headers and destination ports being used. In this case, each CMTS 120 preferably has a direct connection to the server hosting the captive portal web application, where the direct connection is usually achieved by direct VLAN connections from each CMTS 120 to the LAN where the said server resides.

The following examples illustrate users attempting fraud detected and managed by the above described embodiments. If a forger modifies a second cable modem 110*c* so that it uses the MAC address of a first cable modem 110*a* belonging to an active subscription, and the first cable modem 110*a* is connected to the network. However, the forger does not modify the serial number, so that the first cable modem 110*a* has a different serial number from the second cable modem 110*c*. Once the second cable modem 110*c* has been modified, the forger connects the second cable modem 110*c* to the network, turns the second cable modem 110*c* on and the second cable modem 110*c* boots and registers to the CMTS 120.

This fraud may be detected when the network collector 140 scans the second cable modem 110*c* through SNMP after it registers and receives at least the MAC address and serial number associated to second cable modem 110*c*. The network collector 140 forwards this information, herein the "received information" to the network data converger 150. Next, the network data converger 150 queries the devices table for the serial number and other information associated to the MAC address in the received information tuple, herein referred to as "stored information" to the result of this query. Since the stored and received serial number do not agree, the NDC 150 detects fraud coming from the second cable modem 110*c* with the classification "Different serial number."

The network data converger 150 communicates with database engine 170 to insert an entry in the policies table with the fraud information including the MAC address of the cable modem 110*a-f*, the location of the cable modem 110*a-f* (e.g., IP address of the CMTS 120 or MAC domain), and the fraud classification. The policy server 130 polls the policies table to check for new policies periodically. Once the policy server 130 reads this new entry, the policy server 130 sends a set-gate command to the CMTS 120 to create a PCMM gate in order to mark all traffic from this cable modem 110*a-f* exiting through the CMTS 120. Once this happens, every (marked) packet sent by this cable modem 110*a-f* through the CMTS 120 and reaching the edge router 175 is forwarded (by the edge router 175) to the captive portal web application.

In the following example, a second (perfect clone) cable modem 110*c* connects to a CMTS in the cable network. Here, the second cable modem 110*c* has been altered to answer with the MAC address and serial number of a first cable modem 110*a* associated to a valid subscription while the first cable modem 110*a* is online. This may be detected as follows. After the registration procedure the second cable modem 110*c* is scanned through SNMP by the network collector 140, in turns, the network collector 140 forwards information for the second cable modem 110*c* consisting mainly in the MAC, serial number, IP address and circuit ID for the CMTS 120 to the network data converger 150. The network data converger 150 keeps a complete view of all the cable modems 110*a-f*, i.e., can query the devices table. Hence, the network data converger 150 server notes that another cable modem 110*a-f* with the same MAC address and serial number is present and connected to another CMTS 120.

The network data converger 150 checks the aging of the information associated to the first cable modem 110*a* for example, by computing how many minutes elapsed since the entry's timestamp and the moment the check is being made.

Assuming that the aging computed is above the threshold, no fraud is detected. Next, the NDC 150 sends a command to the network collector 140 to scan the first cable modem 110*a*. When the scan results are relayed to the network data converger, the NDC 150 learns that the first cable modem 110*a* has its status as "online." Hence, the NDC 150 detects fraud coming from the second cable modem 110*c* classified as "Original online."

In response, the network data converger 150 inserts an entry in the policies table with the information for the second cable modem 110*c* and the fraud classification. Once the policy server 130 reads the new policy, for example after polling the policies table, the policy server 130 may create a PCMM gate in the CMTS 120 so that the traffic from the second cable modem through the CMTS 120 bares a special mark. Thence, the edge router 175 forwards this marked traffic to the captive portal web application.

In the following example, a second (perfect clone) cable modem 110*c* connects to a CMTS. Under this scenario, the second cable modem 110*c* has been altered to answer with the MAC address and serial number of the first cable modem 110*a* associated to a valid subscription. Assume furthermore that the first cable modem 110*a* is not currently online but has been online earlier at such a time that the aging threshold has been exceeded.

In case the cable operator's network receives more than one cable modem 110*a-f* connection, at different times, with the same MAC address but different MAC domains or CMTS' 120 IP addresses, the cable operator cannot conclude if this is due to fraud or legitimate reasons. For example, maybe the original cable modem 110*a* was turned off and sometime later the cloned cable modem 110*c* is turned on at some other place. This last example would constitute a fraud attempt. On the other hand, maybe the cable modem 110*a* was turned off and reconnected at another network outlet—which connects to another CMTS 120 or MAC domain in the same CMTS 120—or the cable operator has produced "a node split" which has reconnected the cable modem 110*a* to another MAC domain in the CMTS 120 or another CMTS 120. The previous are all legitimate reasons and should not be treated as fraud attempts.

This fraud may be detected as follows. After performing a SNMP scan for the second cable modem 110*c*, the network collector 140 forwards the received information to the network data converger 150, which in turn retrieves the stored information associated to the MAC of the second cable modem 110c from the devices table. Since the stored and received serial numbers agree, no fraud is detected at this point. Next, the NDC 150 checks stored against retrieved CMTS 120 IP addresses and notes that they are different.

The NDC 150 may perform further checks to decide whether the use is legitimate or fraudulent. According to the process described above, the NDC 150 computes the difference between the timestamps in the stored and in the received information. Since the aging threshold has been exceeded, so no fraud is detected, the NDC 150 asks the NC to scan the cable modem 110a and, once done, the network data converger 150 notes that no other cable modem 110a-f with the MAC address of the second cable modem 110c appears online. However, the NDC 150 notes that the last time a cable modem 110a-f with this MAC address was online, it had connected to a CMTS 120 with a different IP address. Since roaming detection has been turned on, the connection for the cable modem 110a-f is detected as potentially fraudulent.

In response to detecting this fraud, the cable modem 110a-f is allowed access but the NDC 150 places the cable modem in a watch list. The watch list may be, for example, a table in the database engine 170 that stores the MAC address, serial number, both CMTS 120 IP addresses (stored and received) and a timestamp describing when was this entry inserted to the table.

During a prefixed period of time, the network data converger 150 may check for the status of the first cable modem 110a in case the first cable modem 110a appears online. The network data converger 150 commands the network controller to send SNMP traps to the CMTS 120 associated to the first cable modem as described in the stored information. During the lifetime of this item in the watch list, the first cable modem 110a registers online to the associated CMTS 120 and the NDC discovers this during one of its periodic checks, then the network data converger 150 marks the watch listed second cable modem 110c as fraud, the watch listed second cable modem 110c is classified as "Original online," and the watch list item is removed from the watch list.

The following example illustrates a broken control fraud. This form of fraud takes place when a user modifies a second cable modem 110c hardware so that the device (the second cable modem 110c) stops responding SNMP communications. Here, the second cable modem 110c is modified to answer with the MAC address of a first cable modem 110a associated to a valid subscription, and the second cable modem 110c does not answer to the SNMP scan from the network collector 140.

This fraud may be detected as follows. The procedure for this case is very similar to those described above, only that in this case the second cable modem 110c does not respond the scan through SNMP and the NDC 150 is not be able to check the validity of the serial number. As before, if the first cable modem 110a is still online and connected to a CMTS 120 with a different IP address, then fraud is detected with the classification "Original online."

In response to detecting this fraud, as described above the network data converger 150 inserts an entry in the policies table with the information for the offending second cable modem 110c and the fraud classification. Once the policy server 130 polls the policies table and reads the new policy, the network data converger creates a PCMM gate in the CMTS 120 so that all the traffic from the second cable modem 110c through the CMTS 120 bares a special mark. Thence, the operators edge router 175 forwards all marked traffic to the captive portal web application.

Alternatively, the network data collector may ask the network collector to attempt scanning the cable modem 110c a predetermined number of times, and if the NC receives no answer after the number of failed scan attempts reaches this predetermined number, then the NDC detects fraud with the classification "Broken Control".

The following is an example of an uncapped cable modem fraud. Here, a form of fraud takes place when a user modifies the configuration file in his cable modem 110a-f so that the configuration set by the cable operator through the provisioning group as defined in the subscription plan is ignored or partially ignored, and any or both of the upwards and downwards speeds are redefined by the subscriber. The subscriber may want to get faster speeds than those included in his subscription, and he may obtain them by tampering with the configuration.

This fraud may be detected as follows. After the registration procedure the cable modem 110a-f, is scanned through SNMP by the network collector 140. The SNMP queries the cable modem 110a-f for its configuration and obtains—in particular—its upwards and downwards speeds. This information is forwarded to the network data converger 150. The NDC 150 can obtain the MAC address for the uncapped cable modem, use this to query the devices table to obtain the subscription ID underlying this cable modem, and query the subscription table with the subscription ID to obtain the allowed upward and downward speed, and hence it can verify that the speeds configured in the cable modem 110a-f are the same as those established in the database. If there is any difference between the upwards speed reported by the cable modem 110a-f and that in the subscription table, then fraud is detected. Analogously, if there is any difference between the downwards speed reported by cable modem 110a-f and in the subscription table, then fraud is detected.

The NDC 150 may optionally query via SNMP the CMTS 120 for the upwards and downwards speed it has been configured to use with the cable modem 110a-f. Again, if any of these differ from those obtained from the subscription table, then fraud is detected. Corroborating this through the CMTS 120 instead of relying exclusively in the cable modem 110a-f may be particularly important if the cable modem 110a-f does not respond to SNMP queries.

In response to detecting this fraud, as described above, the network data converger 150 inserts an entry in the policies table with the information for the offending cable modem 110a-f and the fraud classification. Once the policy server 130 polls the policies table and reads the new policy, the network data converger creates a PCMM gate in the CMTS 120 so that all the traffic from this cable modem 110a-f through the CMTS 120 bares a special mark. Thence, the operators edge router 175 forwards all marked traffic to the captive portal web application.

There are several actions associated to cable modems 110a-f that have either been placed in the captive portal or a watch list. The reporting capabilities are used to give the cable operator a clean picture of fraud attempts stopped and what goes on with the watch list, all this may be broken down by different dimensions including but not limited to: fraud classification, CMTS 120, cable modem vendor.

The Real-Time Monitor may be, for example, a web application, hosted in the web server 160. The Real-Time Monitor displays fraud information in real time. The reports and features may include, but are not limited to, a number of detected frauds in a given date range versus time, a number of detected frauds in a given date range versus time, where the different fraud classifications are distinguished, a pie chart describing the proportions each fraud classification occupies among the total detected frauds within given dates, device-specific information for cable modems 110a-f used to commit fraud, e.g., serial number, CMTS 120 IP, firmware version, and information about the status of the enforcement through the Policy server 130 in case it applies. The tool can present the status of each PCMM gate in the CMTS 120. This status information is provided by the Policy server 130 and is updated in the database at regular basis. If, for example, a gate could not be synchronized and hence-it is not being applied, the user can retry the application of the gates.

In one scenario the cable operator company may assign an employee, herein called the fraud officer, to manage fraud attempts. Here, the job of the fraud officer is to review the fraud attempts and act on this. In order to remove threats or mitigate them, a cable modem 110a-f could be banned from connection or a subscription terminated due to contract breach. Or, alternatively, a CMTS 120 is causing problems to valid users and needs to be updated or replaced.

The main use case for the real-time monitor consists in that the fraud officer logging into the real-time monitor web application, reviewing how many fraud cases have been detected, for example in the last week, and which is their fraud classification. Depending on the amount of fraud attempts detected, the fraud officer may filter last week's fraud attempts by a specific fraud classification (and other parameters). Next, the fraud officer may bring up a table with all the details about the (filtered) fraud attempts. Finally the fraud officer may request more information about a specific device. The real-time monitor can access all the tables in the NDC 150 and NC, so he could query the vendor and model of the cable modems 110a-f involved, or he could check which are the timestamps for the stored and retrieved information in each fraud, the geographical location of the intervening CMTS 120, et cetera.

On another case, the cable operator employee may review the list of cable modems 110a-f that appear in the watch list to uncover patterns. For example, retrieve the places and times where the same MAC address registers and unregisters.

FIG. 2 shows a second network 200 that is a variation of the network 100 of FIG. 1 to illustrate a second embodiment of the fraud detection system and method. A value-added services (VAS) router 290 is a network device which provides a secure channel over the Internet between the local network consisting of all the CMTS 120 and a VAS server 280, located in the cloud/internet. It also provides the functionality of a TFTP server to the CMTS 120 (and the cable modems 110a-f that connect to them). Moreover, in conjunction with the VAS server 280, it will provide the capabilities of a network collector 140 (FIG. 1).

The value-added services (VAS) server 280 is a network device which provides a secure channel over the Internet between the VAS router 290 and the cloud services, including but not limited to database, web server and Network data converger 150 (NDC 150) services.

The network 200 under the second embodiment may be implemented by a company providing services to cable operators. As described earlier regarding the network 100 under the first embodiment (shown in FIG. 1), the service provider may install new equipment in the network 100 (FIG. 1) of the cable operator and configure devices to work as described earlier.

Alternatively, the cable operator may only add to their architecture a configured VAS router 290, as pictured in FIG. 2. The VAS server 280 and remaining services may all be provided by the services company.

More explicitly, assume the cable operator runs a cable network 200 (with no fraud prevention systems) including cable modems 110a-f, one or more CMTS 120 and a provisioning group. The service provider adds to this private network a VAS server 280, and assume the VAS server 280 is configured to connect through an edge router 175. The service provider runs a LAN network of its own including a VAS router 290, a policy server, a database management system, a captive portal manager and captive portal web application. The VAS server 280 and VAS router 290 may be connected through a secure connection, for example, a virtual private network (VPN). Where the network collector within the VAS router 290 is configured to scan cable modems 110a-f and results to the network data converger 150 through the VAS server 280-VAS router 290 connection, and analogously where the network data converger 150 can ask the network collector to execute commands and relay results.

The main difference here is that these new servers may by hosted in a totally different physical location, since the VAS router 290 to VAS server 280 connection may be over the internet. In particular, the service provider may handle all the management of this equipment, and may scale them (add more equipment) as needed.

Figure 3:
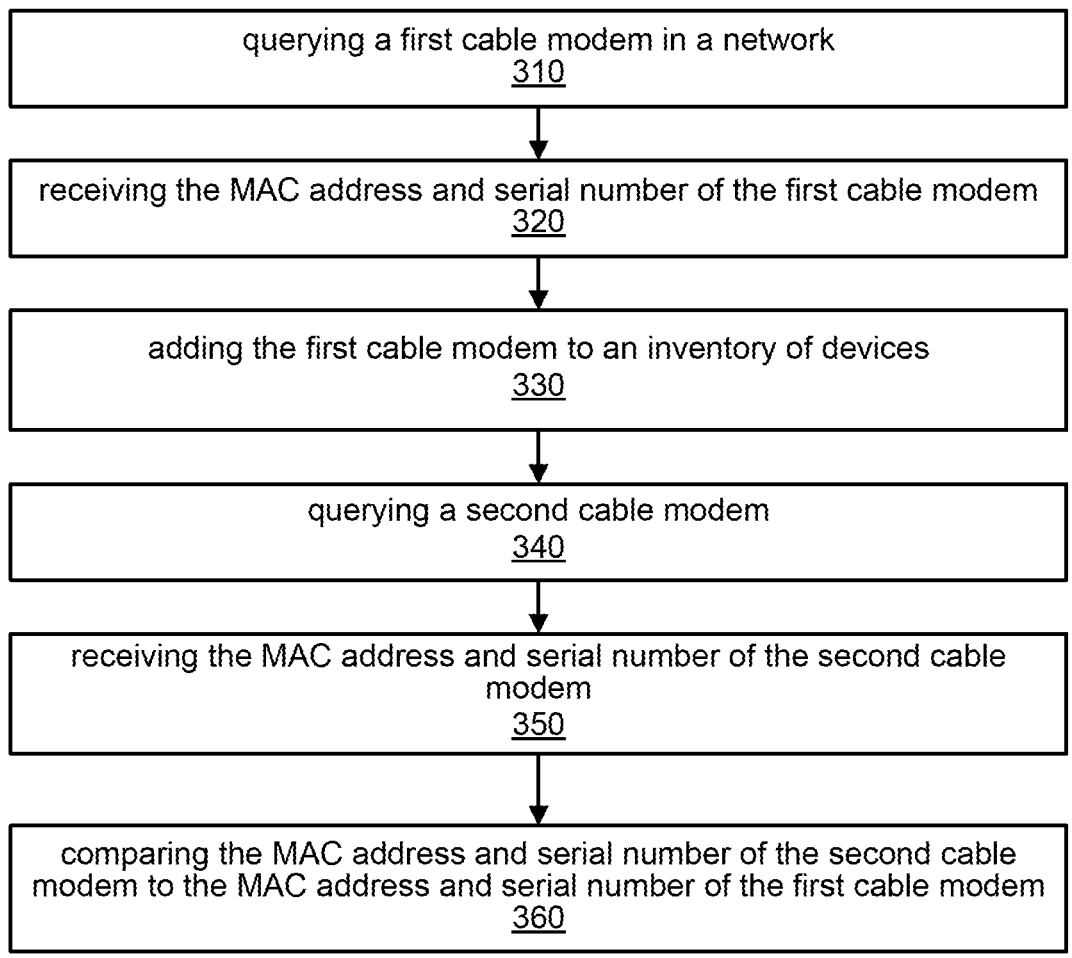
FIG. 3 is a flowchart 300 of an exemplary method for detecting fraud in a network.

FIG. 3 is a flowchart 300 of an exemplary method for detecting fraud in a network. It should be noted that any process descriptions or blocks in flowcharts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention.

A first cable modem in a network is queried, for example, via SMTP, as shown by block 310. The MAC address and serial number of the first cable modem is received as a result of the query, as shown by block 320. The first cable modem is added to a devices inventory, as shown by block 330. A second cable modem in a network is queried, for example, via SMTP, as shown by block 340. The MAC address and serial number of the first cable modem is received as a result of the query, as shown by block 350. The MAC address and serial number of the second cable modem is compared to the MAC address and serial number of the first cable modem, as shown by block 360. If the first serial number and MAC address does not match the second serial number and MAC address, it is determined that an instance of fraud has occurred.

Figure 4:
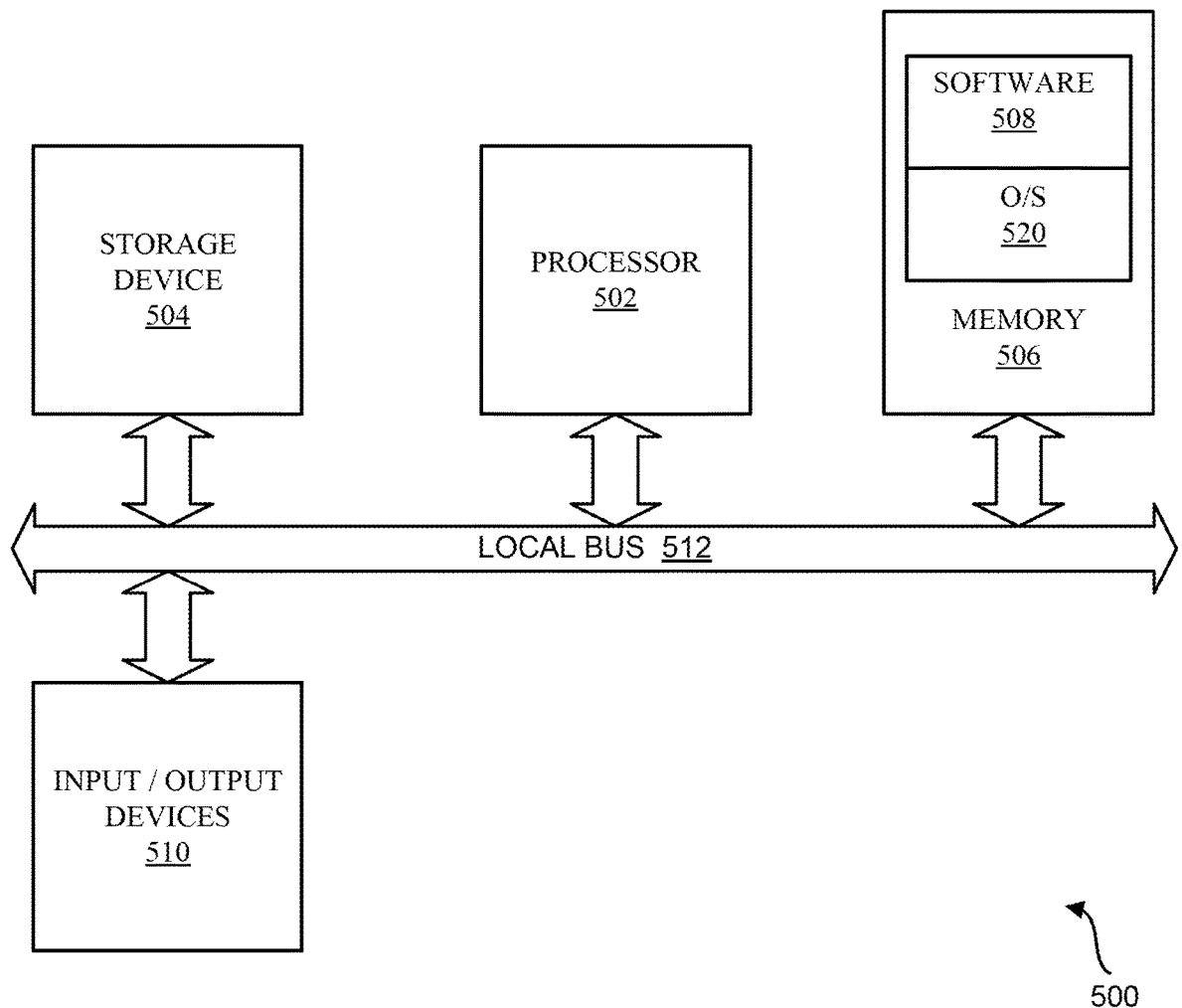
FIG. 4 is a schematic diagram illustrating an example of a system for executing functionality of the present invention.

The present system for executing the functionality described in detail above may be a computer, an example of which is shown in the schematic diagram of FIG. 4. The system 500 contains a processor 502, a storage device 504, a memory 506 having software 508 stored therein that defines the abovementioned functionality, input and output (I/O) devices 510 (or peripherals), and a local bus, or local interface 512 allowing for communication within the system 500. The local interface 512 can be, for example but not limited to, one or more buses or other wired or wireless connections, as is known in the art. The local interface 512 may have additional elements, which are omitted for simplicity, such as controllers, buffers (caches), drivers, repeaters, and receivers, to enable communications. Further, the local interface 512 may include address, control, and/or data connections to enable appropriate communications among the aforementioned components.

The processor 502 is a hardware device for executing software, particularly that stored in the memory 506. The processor 502 can be any custom made or commercially available single core or multi-core processor, a central processing unit (CPU), an auxiliary processor among several processors associated with the present system 500, a semiconductor based microprocessor (in the form of a microchip or chip set), a macroprocessor, or generally any device for executing software instructions.

The memory 506 can include any one or combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory 506 may incorporate electronic, magnetic, optical, and/or other types of storage media. Note that the memory 506 can have a distributed architecture, where various components are situated remotely from one another, but can be accessed by the processor 502.

The software 508 defines functionality performed by the system 500, in accordance with the present invention. The software 508 in the memory 506 may include one or more separate programs, each of which contains an ordered listing of executable instructions for implementing logical functions of the system 500, as described below. The memory 506 may contain an operating system (O/S) 520. The operating system essentially controls the execution of programs within the system 500 and provides scheduling, input-output control, file and data management, memory management, and communication control and related services.

The I/O devices 510 may include input devices, for example but not limited to, a keyboard, mouse, scanner, microphone, etc. Furthermore, the I/O devices 510 may also include output devices, for example but not limited to, a printer, display, etc. Finally, the I/O devices 510 may further include devices that communicate via both inputs and outputs, for instance but not limited to, a modulator/demodulator (modem; for accessing another device, system, or network), a radio frequency (RF) or other transceiver, a telephonic interface, a bridge, a router, or other device.

When the system 500 is in operation, the processor 502 is configured to execute the software 508 stored within the memory 506, to communicate data to and from the memory 506, and to generally control operations of the system 500 pursuant to the software 508, as explained above.

When the functionality of the system 500 is in operation, the processor 502 is configured to execute the software 508 stored within the memory 506, to communicate data to and from the memory 506, and to generally control operations of the system 500 pursuant to the software 508. The operating system 520 is read by the processor 502, perhaps buffered within the processor 502, and then executed.

When the system 500 is implemented in software 508, it should be noted that instructions for implementing the system 500 can be stored on any computer-readable medium for use by or in connection with any computer-related device, system, or method. Such a computer-readable medium may, in some embodiments, correspond to either or both the memory 506 or the storage device 504. In the context of this document, a computer-readable medium is an electronic, magnetic, optical, or other physical device or means that can contain or store a computer program for use by or in connection with a computer-related device, system, or method. Instructions for implementing the system can be embodied in any computer-readable medium for use by or in connection with the processor or other such instruction execution system, apparatus, or device. Although the processor 502 has been mentioned by way of example, such instruction execution system, apparatus, or device may, in some embodiments, be any computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the processor or other such instruction execution system, apparatus, or device.

Such a computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the system 500 is implemented in hardware, the system 500 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method in a network comprising a network collector, a cable modem termination system (CMTS), a network data converger, and a plurality of cable modems comprising a first cable modem having a first cable modem device identification and a second cable modem having a second cable modem device identification, the method comprising the steps of:
   simple network management protocol (SNMP) scanning by the network collector the first cable modem;
   receiving from the first cable modem as a result of the scanning the first cable modem device identification and from the first cable modem and/or from the CMTS a first CMTS internet protocol (IP) address of a first CMTS connected to the first cable modem;

sending the first cable modem device identification and the first CMTS IP address to the network data converger;

adding to a devices inventory by the network data converger at least one of the group consisting of the first cable modem device identification, the first CMTS IP address, and a timestamp indicating a time of the adding;

SNMP scanning by the network collector the second cable modem;

receiving from the second cable modem as a result of the scanning the second cable modem device identification and from the second cable modem and/or from the CMTS a second CMTS IP address of a second CMTS connected to the second cable modem;

sending the second cable modem device identification and the second CMTS IP address to the network data converger;

querying by the network converger an entry of the devices inventory with the second cable modem device identification;

receiving by the network data converger the first cable modem device identification, comparing by the network data converger the first cable modem device identification to the second cable modem device identification, and the first CMTS IP address to the second CMTS IP address; and determining a first fraud based on the comparison.

2. The method of claim 1, wherein the first fraud is determined if the first cable modem device identification is the same as the second cable modem device identification, and the first CMTS IP address is different from the second CMTS IP address if roaming is not permitted.

3. The method of claim 1, wherein the first cable modem device identification comprises a first MAC address for the first cable modem and a first serial number of the first cable modem, the second cable modem device identification comprises a second MAC address for the second cable modem and a second serial number of the second cable modem, and the first fraud is determined if the first MAC addresses is the same as the second MAC address, and the first serial number is different from the second serial number.

4. The method of claim 1, wherein the devices inventory comprises for each device at least one of the group comprising a serial number, a MAC address, a subscription ID, an IP address of a CMTS connected to the device, a MAC domain where the first cable modem connects to the CMTS, and a most recent timestamp recording a response from the first cable modem.

5. The method of claim 1, wherein the first cable modem device identification comprises a first MAC address for the first cable modem and a first serial number of the first cable modem, and the second cable modem device identification comprises a second MAC address for the second cable modem and a second serial number of the second cable modem, the method further comprising the steps of, receiving by the network collector the MAC domain in the CMTS to which the first cable modem connects to, and relaying this information to the network data converger;

receiving by the network collector the MAC domain in the CMTS to which the second cable modem connects to, and relaying this information to the network data converger;

receiving by the network data converger the MAC address, serial number and MAC domain for the first and second cable modem; and determining a second fraud when MAC addresses agree, the serial numbers agree, and the MAC domains differ.

6. The method of claim 1, wherein the network data converger comprises a configured aging threshold, it is configured to accept roaming, and the network data converger is configured to compute an aging as the number of minutes between the current time and the timestamp in the devices inventory for the first cable modem, the method further comprising the steps of:

detecting a potential fraud if the first cable modem device identification is the same as the second cable modem device identification, and the first CMTS IP address is different from the second CMTS IP address, detecting a second fraud if the potential fraud is detected and the elapsed time is smaller than the configured aging threshold;

if the potential fraud is detected and the elapsed time is larger than the configured aging threshold or if the elapsed time is equal to the configured aging threshold, asking by the network the network collector to scan the MAC address of the first cable modem through the first CMTS to verify whether the first cable modem is connected to the network; and determining an occurrence of a third fraud if the first cable modem is connected.

7. The method of claim 6, further comprising the step of:

if the potential fraud is detected, the elapsed time is larger than or equal to the aging threshold, and the first cable modem is not connected to the network, adding by the network data converger of the second cable modem to a watch list table, the table entry comprising the MAC address, serial number, CMTS IP address for the second and first cable modems, and a timestamp describing when the addition to the watch list table happens.

8. The method of claim 7, wherein:

the network data converger is configured with a watch list threshold;

the network data converger is configured to periodically check for each item in the watch list if the first cable modem is connected to the network, wherein the check comprises asking the network collector to scan for the MAC address of the first cable modem through the CMTS for the first cable modem if the cable modem is active;

the network data converger detects a fourth fraud in one item of the watch list if the scan returns that the first cable modem is active, and removes the item from the watch list; and the network data converger is configured to remove all items in the watch list for which the elapsed time is greater than the configured watch list threshold.

9. The method of claim 1, wherein if the first fraud is determined at least one step is executed from the group consisting of logging an event, redirecting traffic of the second cable modem to a captive portal, and blocking the second cable modem.

10. A method for detecting uncapped modem fraud by a cable modem connected to a network comprising a database engine, a network collector, a network data converger and a Cable Modem Termination System (CMTS), the method comprising the steps of:

simple network management protocol (SNMP) scanning by the network collector the cable modem to obtain a configured upward speed and/or downward speed of the cable modem;

sending the configured upward speed and/or downward speed of the cable modem to the network data converger;

querying, by the network data converger, the database engine for an allowed upward speed and/or downward speed of a subscription plan associated with the cable modem;

comparing the allowed upward speed and/or downward speed with the configured upward speed and/or downward speed; and determining an occurrence of fraud based upon the comparing.

11. The method of claim 10, further comprising the steps of:

sending an SNMP command to the CMTS asking for a used upward speed and/or downward speed by the cable modem; and comparing the used upward speed and/or downward speed with the configured upward speed and/or downward speed.

12. The method of claim 10, further comprising the step of performing a configured action if fraud is determined, wherein the configured action comprises at least one of the group consisting of logging an event, redirecting traffic of the cable modem to a captive portal, rebooting the cable modem, adding the cable modem to a watch list table in the database management engine, and blocking traffic to and/or from the cable modem.

13. A method for detecting fraud in a network comprising a network collector, a cable modem termination system (CMTS), a network collector, a network data converger, and a cable modem, the method comprising the steps of:

the network data converger asking the network collector to send a SNMP command to a cable modem; and relaying this information to the network data converger if the cable modem does not respond;

incrementing a lack of response counter by the network data converger; and if the response count reaches a predetermined threshold, determining an occurrence of fraud.

14. A method for a cable network comprising a network collector, a cable modem termination system (CMTS), and a plurality of cable modems, the method comprising the steps of:

maintaining by a network collector devices inventory of the plurality of cable modems, comprising for each of the plurality of cable modems a serial number, MAC address, subscription ID, an IP address and/or MAC domain of the CMTS that connects to the cable modem, and a timestamp when the cable modem was last detected in the network;

receiving, by the network data converger, the IP address of a connecting cable modem of the plurality of modems when the connecting cable modem connects to the network, the network data converger asking the network collector 140 to scan the connecting cable modem for its MAC address and serial number and adding this information to a devices inventory; and periodically simple network management protocol (SNMP) scanning the plurality of cable modems through the CMTS to update the devices inventory.

15. A method for providing fraud detection by a service provider to a cable operator, where a cable operator network comprises a plurality of cable modems each connected to cable modem termination systems (CMTS) and a provisioning group, comprising the steps of:

adding and configuring a VAS server to the cable operator network, the VAS server configured by the service provider, providing the capabilities of a network collector and connected to a VAS router through an edge router, the VAS router connecting to a database management system, a policy server, captive portal manager and web application, and a network data converger, the network data converger commanding the network collector within the VAS server to perform actions on its behalf; these actions comprising simple network management protocol (SNMP) scanning one or more cable modems of the plurality of cable modems;

the network collector executing actions on behalf of the network data converger, and relaying the information collected to the network data converger.

16. The method of claim 15, further comprising the steps of:

SNMP scanning, by the network collector within the VAS server, the first cable modem;

receiving the MAC address, and serial number of the first cable modem;

sending the MAC address and serial number of the first cable modem to the network data converger;

adding by network data converger the first cable modem to a devices inventory, the addition comprising at least MAC address and serial number;

SNMP scanning by the network collector the second cable modem;

receiving the MAC address and serial number of the second cable modem;

sending the MAC address and serial number of the second cable modem to the network data converger;

the network data converger querying the devices inventory for entries with MAC address equal to that of the second cable modem; the network data converger receiving the information for the first cable modem, comparing by the network data converger the MAC address and serial number of the second cable modem to the MAC address and serial number of the first cable modem; and determining an occurrence of fraud when the MAC addresses are the same, but the serial numbers are the different.

17. A system in a network comprising:

a database engine;

a network collector;

a network data converger server; and a Cable Modem Termination System (CMTS), wherein the system is configured to detect fraud by a device connected to the network by performing the steps of:

querying the device via simple network management protocol (SNMP) to obtain a device identification and/or a device configuration;

querying the database engine for a recognized device identification and/or an allowed device configuration associated with the recognized device identification; and comparing the device identification and/or the device configuration with the recognized device identification and/or the allowed device configuration; and determining an occurrence of fraud based upon the comparing.

18. The system of claim 17, wherein the network comprises a local area network (LAN) and/or a wide area network (WAN) and further comprising an edge router connecting the network to the internet.

19. The system of claim 18, wherein the network further comprises a service provider LAN comprising:
- a policy server,
- a database management system,
- a captive portal manager and captive portal web application; and
- a value-added services (VAS) server in communication with the edge router; and
- a VAS router in communication with the VAS server via a secure connection,
- wherein the VAS router further comprises a VAS router network collector.

20. The system of claim 19, wherein:
- the VAS router is configured to scan a cable modem;
- the VAS router is configured to relay scan results to the network data converger; and
- the network data converger is configured to request the network collector to execute commands and relay results.

21. The system of claim 17, further comprising a real-time monitor configured to view statistics of fraud attempts, wherein the statistics comprise at least one of the number of fraud attempts per day, the number of fraud attempts per CMTS, and the number of fraud attempts per cable modem make and/or model.

* * * * *